UNITED STATES PATENT OFFICE.

BRUNO JANSEN, OF MEININGEN, GERMANY.

PROCESS OF MANUFACTURING ROTARY CUTTERS.

SPECIFICATION forming part of Letters Patent No. 703,930, dated July 1, 1902.

Application filed July 6, 1901. Serial No. 67,360. (No specimens.)

*To all whom it may concern:*

Be it known that I, BRUNO JANSEN, engineer, a subject of the Duke of Saxe-Meiningen, residing at Meiningen, in the Duchy of Saxe-Meiningen and German Empire, have invented certain new and useful Improvements in Processes of Manufacturing Rotary Cutters, of which the following is a specification.

The subject-matter of the present invention concerns a process for the production by casting of rotary cutters which have heretofore been made of cast-steel by mechanical elaboration only. For this purpose the raw material for the rotary cutters, containing a certain percentage of carbon, is cast, being treated to this end with an addition of a suitable material rich in carbon, so as to facilitate its being readily cast—that is to say, to be reduced to the necessary liquid state and rendering it readily fusible. The excess of carbon introduced by this addition will entail a uniform distribution of the entire carbon in the fused material, so that the whole charge assumes a thoroughly homogeneous condition, the before-mentioned excess of carbon being thereupon abstracted from the fused material by puddling. In this process in consequence of the oxidation of carbon occurring on its coming into contact with the oxygen of the atmosphere the temperature of the fused charge is increased, thus preventing the fused material from becoming thick on the abstraction of the carbon. The cast-steel thus obtained is in a sufficient state of liquidity to be readily cast in molds and to well fill the same. Such cast rotary cutters will thereupon have a thoroughly homogeneous material, and consequently are easily worked, very susceptible to hardening, and if finished in the usual way they will possess extraordinary cutting capabilities.

Hitherto rotary cutters were simply and solely produced by severing pieces of cast-steel of the approximate size of the rotary cutter to be produced from a cast-steel ingot—say, for instance, by means of the cold saw or by cutting it off in the hot state—and thereupon subjecting these pieces to a long characteristic series of processes of elaboration—viz., forging, drilling, shaping on the lathe and on the shaping-machine, finishing on the lathe, and polishing—in order to give them the form of a rotary cutter. This mode of preparing rotary cutters, in which the characteristic series just described of processes of elaboration difficult in themselves had to be gone through each time, is exceedingly laborious and dilatory, and, moreover, has the further disadvantage that too much material is wasted in the course of this elaboration; but, as is well known, the material used for rotary cutters must have the following properties: It must be capable of being easily machined with the necessary tools—that is to say, it must be easily workable—and it must be capable in the hardened state of cutting the commonly-used metals—that is to say, these metals should be readily worked by means of these rotary cutters; but the capability of good and uniform elaboration of a steel material will depend essentially on the uniform distribution of the carbon in the iron, while the hardness of the material will depend on the percentage of carbon.

In order to produce by means of the process in question rotary cutters of any kind, shape, and size by casting in molds, so that after being cast they shall be capable of being hardened and workable in a high degree, it will be necessary in the first place to render the material used—namely, a variety of cast-steel—suitable for ready casting, to impart to it a homogeneous nature by the addition of carbon in excess, and to reëliminate this excess of carbon by a suitable means before the casting process.

The process forming the subject-matter of the present invention is as follows: A mixture consisting either of cast-iron, cast-steel, and wrought-iron or of wrought-iron and cast-iron or cast-steel alone—in short, a material containing a percentage of carbon corresponding to that which is intended to be contained in the material for the rotary cutters to be made—is melted. Seeing now that such a material is not at all readily fusible, on account of the comparatively low percentage of carbon, a considerable excess of carbon is introduced, for this reason as well as for reasons to be stated later on, by adding to the charge some very highly carbureted iron, (gray pig-iron or cast-iron.) This total charge, which is now readily fusible, contains a considerable excess of carbon, which will be reduced by oxidation during the melting process to a very small extent only. Owing to this comparatively high percentage of carbon the entire charge will not only fuse very readily, but the carbon will combine with the iron in an exceedingly uniform manner throughout the highly-liquefied metal, so that the latter assumes a perfectly homogeneous condition. If now such a material were to be employed direct for making rotary cutters, it would, on account of its high percentage of carbon, be lacking sufficient strength. Consequently after the whole charge has been completely liquefied the excess of carbon must be eliminated in order to obtain a material containing the predetermined percentage of carbon for the rotary cutter. This is done by vigorously stirring the molten metal in the crucible, thus bringing it into intimate contact with the oxygen of the air. By this means a large proportion of the carbon is burned to carbonic acid; but by this combustion the heat of the entire charge is increased, whereby the fused metal is prevented to a great extent from getting thick on account of the reduction of the amount of carbon contained in it. In the furnaces employed the fused metal will boil in consequence of its high liquidity, due to the high percentage of carbon present, this being the peculiarity of the present process. This ebullition of the fused metal will take place when the latter has attained its maximum temperature. The conditions of temperature in this respect are situated so that after the metal has been stirred for some time the ebullition will cease completely—a circumstance corresponding to a relative reduction of temperature—that is to say, an incipient viscosity of the liquid metal, due to the decrease of carbon. It has been found that at this point the correct percentage of carbon exists, so that this cessation of ebullition (which, as a matter of fact, is absolutely necessary in order that the metal may be fit for casting) is the signal for discontinuing the decarburization. Aluminium having then been added in order to prevent disengagement of gases, the fused metal is poured into the rotary-cutter molds, which should previously be well dried and heated. In this way a rough casting of the rotary cutter is obtained, which need only be finished, dressed on the lathe, and polished, the rotary cutter having such a uniform texture, and consequently a great capability of being worked, as to render it unnecessary to anneal it before elaboration. Experiments have shown that the material is easier to work than cast-steel and is quite as capable of being hardened. After the cutter is finished it is hardened and may then be used like any other rotary cutter. It will possess at least equal properties to those possessed by rotary cutters made of cast-steel in the manner described in the introduction.

The above-described treatment of the charge by adding an excess of carbon will therefore serve the purpose of producing a material of exceedingly uniform texture and easily worked after casting and promoting the fusibility of the charge before the rediminution of the carbon by oxidation. As the charge contains a high percentage of carbon, it is possible to liquefy the material to an extraordinarily high degree in ordinary crucible-furnaces, and the carbon is thereby distributed with uncommon uniformity throughout the whole mixture in a dissolved form, (so-called "hardening carbon.") This uniform distribution of the carbon will of course be in no way impaired during the subsequent decarburization by stirring, but will rather be increased thereby. On account of the very homogeneous texture and owing to the fact that at the period of congelation of the cutter in the mold a small portion of the dissolved carbon is already combined quite uniformly with the material the cast cutter will possess a very considerable degree of strength and after being hardened will have a high degree of hardness and cutting power. Such cast rotary cutters are cheaper by one-half than cast-steel rotary cutters made in the ordinary way, provided that the manufacture of one cutter only of one and the same kind is in question. If several cutters of the same kind are to be turned out by casting, the cost price of cast cutters will be reduced to one-third of that of ordinary cast-steel cutters.

The present process of producing rotary cutters by casting, moreover, possesses the important advantage that old material, such as scraps and the like, can be used for melting down, which would otherwise have to be sold as old iron, while it may be thus utilized for producing a very valuable material.

It has been found that twenty-four parts, by weight, of a mixture containing the percentage of carbon which the rotary cutter is intended to contain and eleven parts, by weight, of gray pig-iron containing three and one-half per cent. of carbon (by way of excess of carbon) is a very good proportion.

Having thus fully described my invention, what I claim as new, and desire to secure by Letters Patent, is—

A process of manufacturing rotary cutters, which consists in melting down a charge composed of a material containing the percentage of carbon intended to be contained in the finished cutter until the said charge is thoroughly liquefied to insure a uniform distribution of the carbon in the material, then puddling the entire fused charge by vigorous stirring so as to cause the excess of carbon to be burned by the oxygen of the atmosphere through which the temperature of the charge is raised whereby the latter is kept thoroughly liquid until after the oxidation of all the excess of carbon and the fused metal recommences to become thick, adding aluminium to prevent disengagement of gases or porosity while casting, and then suitably casting the fused metal.

In testimony whereof I have hereunto set my hand in presence of two subscribing witnesses.

BRUNO JANSEN.

Witnesses:
 ERNEST GUMPERT,
 MAX SCHUSTER.